United States Patent Office 3,223,509
Patented Dec. 14, 1965

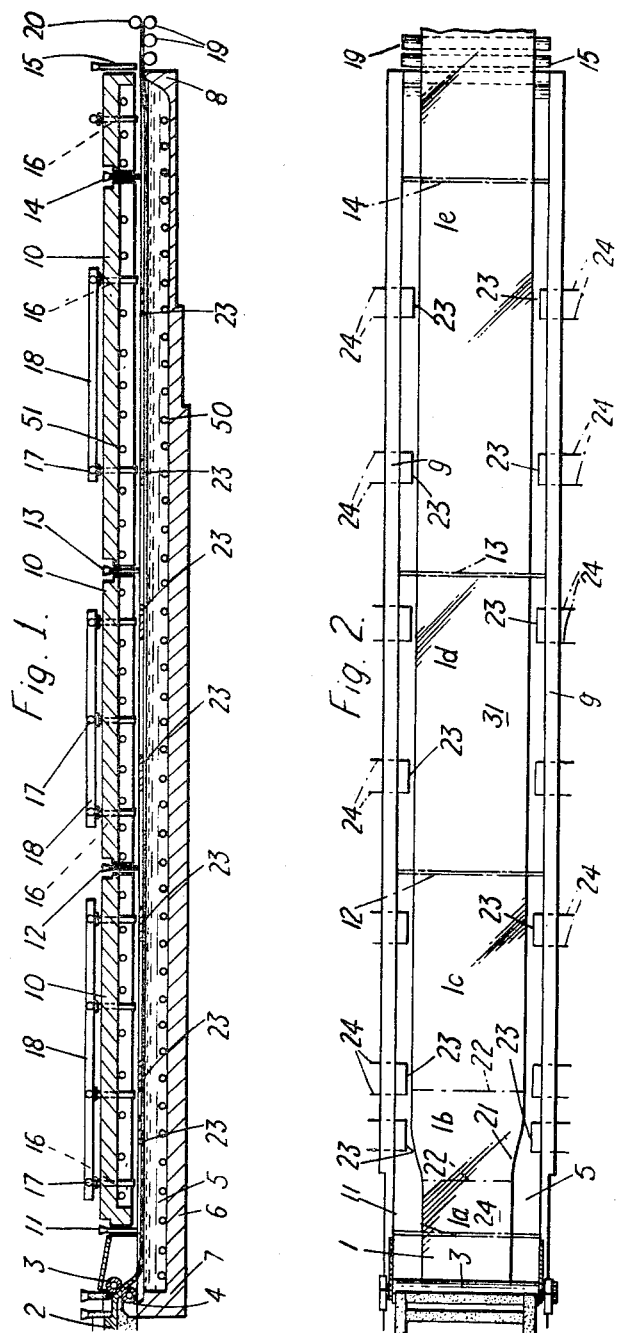

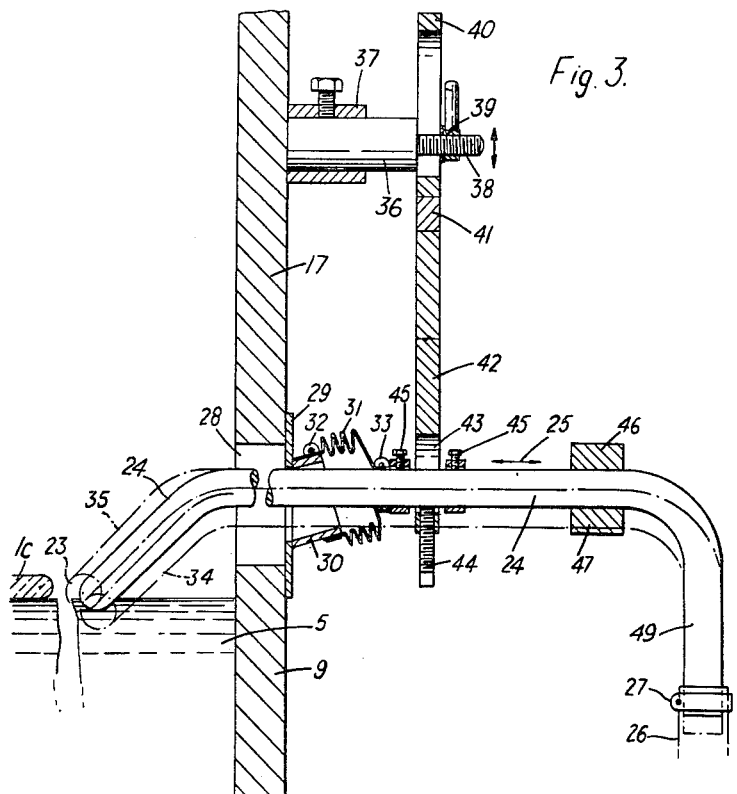
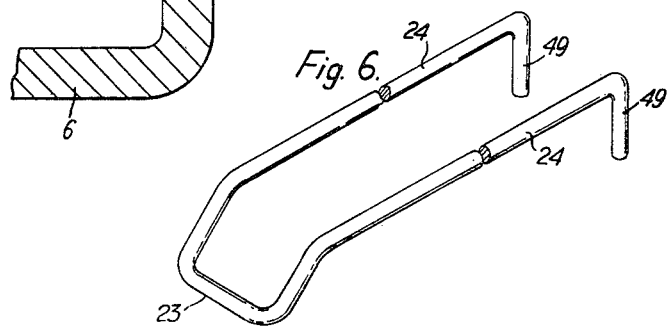

3,223,509
APPARATUS FOR THE MANUFACTURE OF FLAT GLASS
Richard Barradell-Smith, St. Helens, and Frederick William Silverwood, Appley Bridge, England, assignors to Pilkington Brothers Limited, Liverpool, England, a British company
Filed Aug. 10, 1960, Ser. No. 48,677
Claims priority, application Great Britain, Aug. 28, 1959, 29,513/59
9 Claims. (Cl. 65—182)

This invention relates to the manufacture of flat glass and in particular to apparatus comprising the combination with a tank structure including a tank contain a molten bath which bath is chemically inert to the glass, of means for delivering glass to the bath and for advancing the glass along the bath.

In the production or processing of glass on a molten bath there is a tendency for the glass to drift from a desired path as it is advanced along the bath, due to lateral forces exerted on the glass which are generally due to convection currents in the molten bath or to hydrodynamic instability.

It is a main object of the present invention to provide an improved apparatus of the kind referred to in which control elements are provided to assist in maintaining the glass in a desired path as it is advanced along the bath.

The present invention comprehends the combination with a tank structure including a tank containing a molten bath which bath is chemically insert to the glass, means for delivering glass to the bath and for advancing the glass along the bath, of local tubular control elements arranged in spaced relation with a side of the bath, each said control element consisting of arms freely passing through the respective side wall of the tank structure and an intermediate part connecting the arms and intended to lie lengthwise of the bath, the arms being adapted for connection to a source of a fluid medium for varying the local temperature in the bath by passage of the fluid through the control element, and means for axially adjusting the arms of the elements to set the respective intermediate parts in the desired location in the bath.

The present invention is particularly suitable for the manufacture of flat glass in ribbon form on a bath of molten metal contained in a tank structure over which bath a protecting atmosphere is maintained, the width of the bath surface being greater than the width of the ribbon. Any tendency for the ribbon to be deformed on the bath surface by the formation of long radius bends, or to drift from a desired path due to the inability of the ribbon to resist lateral forces is countered in accordance with the invention by employing local tubular ribbon elements arranged in spaced relation with an edge of the ribbon, each said control element consisting of arms freely passing through the respective side wall of the tank structure and an intermediate part connecting the arms and intended to lie lengthwise of the ribbon, the arms being adapted for connection to a source of a fluid medium for varying the local temperature in the bath by passage of the fluid through the control element, and means for axially adjusting the arms of the elements to set the respective intermediate parts in the desired location in the bath.

The present invention also comprises apparatus for use in the manufacture of flat glass in ribbon form on a bath of molten metal contained in a tank structure over which bath a protecting atmosphere is maintained, the width of the bath surface being greater than the width of the ribbon, which apparatus is characterised by local tubular ribbon control elements arranged in spaced relation with an edge of ribbon, each said control element consisting of arms freely passing through the tank structure, and an intermediate part connecting the arms and intended to lie lengthwise of the ribbon, means for supplying a cooling medium into one arm of each element to flow to the respective intermediate part, means for discharging the cooling medium through the other arm of the element, and means for axially adjusting the arms of the elements to set the respective intermediate parts in desired spaced relation with and in parallelism with the respective ribbon edge.

In such forms of apparatus the control is effected by determining by inspection the localities for selective cooling relative to the edges of the ribbon, and setting each control element with respect to the respective ribbon edge in accordance with circumstances prevailing from time to time in each locality.

From another aspect the present invention comprehends appartus comprising means for steering the ribbon in a desired path along the molten path characterised by a plurality of individual control elements arranged alongside the ribbon, each control element being constituted by a tube bent on itself to form the arms and an intermediate part within the bend which bend is intended to lie in parallelism with the ribbon, means for passing a cooling medium through the tube, vertically adjustable supports for the arms carried by the tank structure to locate the intermediate part of the bend of the tube on the bath and means for axially adjusting the arms in the supports, the tank structure having vertically elongated passages for the arms, and an impervious heat resisting flexible container mounted on each arm and near the tank about the respective passage to form a gas seal about the arms against gas flow through the passage.

In employing such construction the extent of heat exchange with the bath may be modified by varying the volume of cooling medium and/or the temperature of the medium delivered to the element.

The control elements provided according to the present invention may comprise gas seals about the arms of the control elements, each seal being constituted by plates mounted on the tank structure to overlap the respective passage, each plate comprising a socket offset to the plate through which socket one of the arms pass, said socket having a diameter sufficiently greater than that of the arm to permit the arm to be adjusted vertically in the socket to vary the depth of immersion of the said intermediate part of the bend in the bath, and the flexible container mounted on the arm being secured on the respective socket to provide a gas seal over the permitted range of vertical adjustment for the arm.

The arms which form part of the control element employed according to the present invention may be cross braced, and the vertically adjustable support for the arms may comprise a stub on the tank structure above the arms and in the mid-plane thereof, a slotted stem located on the stub and emanating from a bridge carrying two slotted depending plates disposable over the arms, means for clamping the stem to the stub and means for axially setting the arms with respect to the depending plates, whereby the vertical support may be adjusted in a vertical plane and vertically to prescribe the setting of the said intermediate part with respect to the bath surface.

Conveniently also the outer ends of the arms may be downwardly bent to function as handles to facilitate axial displacement of the arms to determine the setting of the spaced relation of the said intermediate part with respect to the adjacent edge of the ribbon of glass.

Preferably, the intermediate part in the bend of a control element, constructed according to the present invention, includes a straight part comprised in an offset to the arms so that in a horizontal position for the arms the straight part in the bend is at the level of the bath surface.

In order that the invention may be more clearly understood a preferred embodiment will now be described, by way of example, with reference to the accompanying diagramatic drawings, in which:

FIGURE 1 is a central longitudinal sectional elevation of aparatus for use in the manufacture of flat glass in ribbon form on a bath of molten metal confined in a tank structure, such apparatus including a roof structure superimposed on the tank structure which roof maintains a protecting atmosphere over the bath, FIGURE 2 is a plan view of the tank structure shown in FIGURE 1, in which plan view is more clearly indicated the positions of the control elements constituted in accordance with the present invention.

FIGURE 3 is a detail sectional side elevation, to a much larger scale than that of FIGURES 1 and 2, for the sake of clarity, taken on the line III to III of FIGURE 4, showing the supports for vertically and horizontally adjusting the control elements.

FIGURE 6 is a perspective view to a smaller scale more clearly showing the form of the control element illustrated in FIGURE 3.

In the drawings like references designate the same or similar parts.

Figure 4:
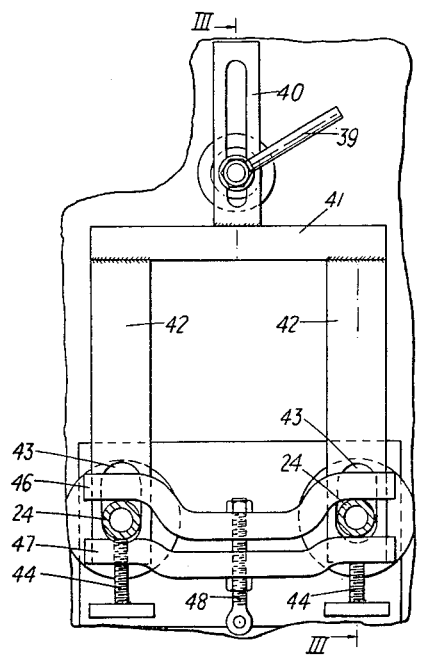
FIGURE 4 is a front elevation taken on the line IV—IV of FIGURE 5.

In the apparatus illustrated in FIGURES 1 and 2 conventional means are shown for forming a ribbon of glass 1, the conventional means comprising a fore hearth 2 and casting rolls 3, 4. The glass in ribbon form leaving the casting rolls is advanced by them on to a bath 5 of molten metal, e.g. tin or an alloy of tin and lead, confined by tank structure which bath is at an elevated temperature and of a specific gravity such that the ribbon of glass leaving the casting rolls forms a layer 1a of glass which floats on the bath.

The tank structure comprises a floor 6, and walls 7, 8 and side walls 9 which walls cenfine the bath of molten metal, and over the tank structure is a roof structure of sectional form, the sections being indicated at 10, the roof structure confining a headspace over the bath in which a protecting gas is maintained.

At the ends of the roof structure and between the roof sections, tweels are provided, indicated at 11, 12, 13, 14 and 15 which sectionalise the headspace in order to facilitate temperature regulation along the bath. The protecting gas is admitted through piping comprising ducting 16 connecting branches 17 and header 18, which are connected to a suitable source of supply, not shown. The protecting gas admitted into the headspace is a gas which will not chemically react with the substance from which the bath is formed, to produce contaminants of the glass, for example metal oxide or sulphides. The gas can be supplied through the ducting to afford a non-oxidizing atmosphere over the bath when the bath is formed of a readily oxidisable metal, such as tin or alloys of tin on which the ribbon of glass can float, and by providing a plenum in the headspace within the roof structure, ingress to the headspace of atmospheric air is prevented.

When the glass 1 is advanced from the casting rolls 3, 4 it forms a plastic layer 1a which layer as it is advanced becomes more and more fluid and in a molten state spreads unhindered on the bath, due to the elevated temperature of the bath which is a temperature of about 1,000° C. to 1,100° C. between the tweels 11 and 12, and as the width of the bath is greater than the maximum width of the ribbon there is developed a buoyant body 1b of fully fluid molten glass of stable thickness which, because of the regulated feed is continuously advanced along the bath in ribbon form. At the tweel 12 the temperature is about 1,000° C. and the fully fluid molten glass in ribbon form 1c which emanates from the fluid buoyant body 1b of stable thickness is progressively advanced along the substantially frictionless surface of the bath.

In that part of the bath between the tweels 12 and 13 the glass has cooled to about 825° C. at which point the ribbon part 1d is becoming firm but is still in a plastic state and could be deformed from the desired straight edge form but between the tweels 13 and 14 the glass has progressively cooled to about 650° C. where the ribbon part 1e is fairly stiff (the viscosity being about $10^7$ poises) and passes under the tweel 14 on its way to the exit from the bath, and thence to a lehr to which it is carried from the bath by traction rolls 19, 20 without damage to the glass.

In FIGURE 2 is clearly illustrated at the parts indicated by the reference 21 where the side edges of the molten layer 1a naturally spread on the bath due to the high temperature of the bath, to form the buoyant body 1b of stable thickness, the area of which is roughly indicated by the chain lines 22.

At the surface of the bath and between the ribbon edges and the side walls 9 of the tanks are disposed control elements constituting in this embodiment surface coolers, in accordance with the invention, and which, as hereinafter more fully explained, comprise an intermediate part between two arms which protrude through the furnace structure, and an intermediate part connecting the two arms. In the example described the intermediate part is straight, but the intermediate part may have a different shape, for example it may be in the form of a helix.

Figure 5:
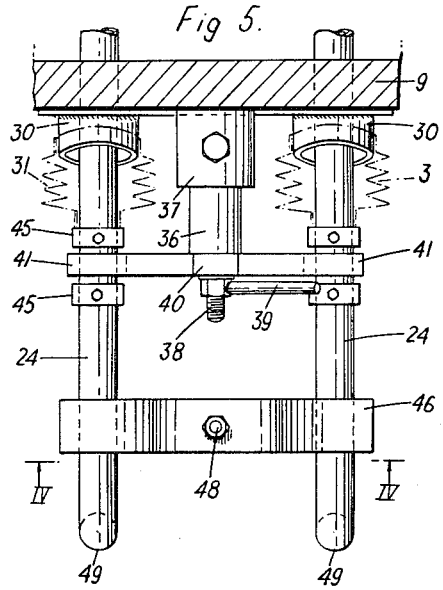
FIGURE 5 is a plan of the constructional arrangement shown in FIGURES 3 and 4.

In FIGURES 1 and 2 location of these coolers is indicated diagrammatically by lines 23 (parallel to the side walls 9) with which are conjoined parallel lines 24 passing through the tank structure, these lines representing respectively the intermediate parts of the control elements and the arms for manipulating the intermediate parts, hereinafter described with particular reference to FIGURES 3 to 6. As clearly shown in FIGURE 2 the control elements are disposed alongside the ribbon which is developed from the layer 1a.

In the construction illustrated in FIGURES 3 to 6 the control element is formed by bending a tube on itself to form the two arms 24 and the straight intermediate part 23 comprised in an offset portion of the arms where it is bent upon itself. The straight part 23 is located at or near the surface of the bath 5 and is movable with respect to the edge of the ribbon by axial displacement to or from the ribbon, as indicated by the arrow 25 in FIGURE 3.

As indicated in FIGURE 3 the ends of the arms 24 are each connected by hose 26 held on to the arms 24 by clips 27 to a cold water supply so that the water can enter one of the arms, flow through the control element, in particular through the straight part 23, and back out through the other arm, whereby the straight part 23 is maintained in relatively cold condition.

The control elements comprising parts 23, 24, 24, are mounted to be vertically adjustable so that the part 23 can be more or less immersed at the surface of the molten bath and thereby vary the superficial area of the part 23 in heat exchange relation with the bath and thus the modifying effect on the intensity of the convection currents to develop steering forces which operate at the surface of the bath, that is at the exposed surface of the molten metal at the sides of the ribbon of glass and/or at the surface of the molten metal and the metal/glass interface. Accordingly the tank structure comprises a vertical elongated aperture 28 of a size to permit the desired lateral displacement in a vertical plane, and in order to prevent contamination of the gases over the bath or loss of the gases from the bath through the passage 28, a plate 29 is mounted on the structure and over the passage and carries a cylindrical socket 30 which is offset upwardly with respect to the plate 29, and carries one end of a flexible container 31, preferably of concertina form, as shown, the other end of which is connected to the respective arm 24.

Clamping bands 32 and 33 respectively hold the extremities of the flexible container to the socket and to the arm so that a gas-tight joint is formed about the socket and the arm, which joint functions throughout the permitted adjustments of the arms in a vertical plane, or the permitted adjustments of the arms in a horizontal plane, that is in an axial direction.

From the foregoing it will be appreciated that the socket 30 has a diameter sufficiently great to permit the desired angular adjustment of the arms in a vertical plane, that is with respect to the passage 28. As clearly shown in FIGURE 3 the arms are so disposed that the straight part 23 intersects the surface of the bath and can be displaced with respect to the surface and/or with respect to the adjacent edge of the ribbon, as clearly shown in chain lines 34 and 35.

Experiments have shown that when cold water is generously supplied through the arms, the straight part 23 should be localised not more than 6" from the respective edge of the ribbon to impose a drag which steers the ribbon of glass in a desired path on the bath. It may be nearer to the edge and instead of resting on the surface of the bath, may be partially or wholly immersed at the surface and the reference herein to selectively cooling the bath in the vicinity of the edges of the ribbon, includes the disposal of the control elements so that the straight parts 23 are not more than 6" from the ribbon edge when the straight part is about one foot in length. However it will be appreciated that should the control of the ribbon by the transverse steering force not be quick enough to eliminate drift the straight parts 23 will act as non-wettable fenders, and can be moved laterally of the bath to apply lateral forces to the ribbon to steer it back into its desired path on the bath.

The vertically adjustable support for the arms is mounted on a stub 36, adjustably carried in a socket 37 carried by the tank structure, the stub carrying a threaded stud 38 on which a clamping nut 39 is mounted. The vertical adjustment comprises in the upper part a slotted stem 40 which is passed over the stud 38 and clamped against the stub 36 by the clamping means 39. The slotted stem 40 emanates from a bridge 41 carrying two depending plates 42 which are slotted at their lower ends, as indicated at 43, for the passage of the arms 24. The slotted stem 40 and the clamping nut 39 provide means for rapidly lifting the control element in case of emergency.

In the bottom part of the plates 42 is a set-screw 44 which is used to set the arms in desired relationship with the plates. By such arrangement the first setting of the arms can be effected by utilising the clamping member 39 and finer adjustment effected by using the set-screws 44. Thereby the degree of immersion of the straight intermediate parts 23 of the control elements in the bath can be precisely prescribed and if necessary precise alignment of the straight part 23 with the surface of the bath effected by operating the set screws 44.

For setting the arms in an axial adjustment with respect to the edge of the ribbon, collars 45 are provided on the arms so that they can be secured in desired relationship with the vertical support. The arms 24 are preferably braced together, as most clearly indicated in FIGURE 4, the bracing consisting of two offset bars 46 and 47 which are centrally clamped together by actuating a threaded rod 48. This bracing apart from assuring parallelism of the arm during tilting affords a counterweight which maintains the arms against the fulcrum constituted by the inner edge of the plates 29.

Conveniently, as clearly shown in FIGURES 3 and 6, the outer ends of the arms 24 are downwardly bent in vertical planes to constitute handles 49 which facilitate axial displacement of the arms to determine straight part 23 in relation to the adjacent edge of the glass ribbon.

Experiments have shown that any drag applied to the transverse steering forces developed at the surface of the molten metal can be modified by adjusting the parts 23 of the control elements with respect to either or both edges of the ribbon of glass, and thereby assist in maintaining the ribbon in a desired path as it is advanced along the bath.

Although in FIGURE 2 the control elements are shown disposed in pairs, one element on each side of the ribbon, the elements may be disposed in staggered relation along the ribbon, so long as the application of the control elements near one edge develops steering forces which operate at the surface from the centre of the bath towards the respective wall of the tank structure by intensifying the convection currents, to give the desired urge to the ribbon towards the wall. This control from one side may be accompanied by retracting the control element on the other side of the ribbon to minimise the convection flow towards that wall of the tank structure, the arrangement of the intermediate parts of the control elements need not be symmetrical with respect to the ribbon, nor need they be all of the same length, for example, according to thermal conditions outside the tank on one side of the ribbon two control elements may be employed in spaced relation of which the total length of the straight part 23 is about the same as that part on one control element on the opposite side of the ribbon.

In accordance with the invention many elements in spaced relation at each side are employed to achieve maximum flexibility of control along those parts of the ribbon where the ribbon of glass is dirigible and could be deformed unless the controls were applied.

The control elements employed according to the present invention are preferably formed from stainless steel tubing, but high silica glass tubing may be employed.

Further, although in the embodiment described herein reference has been made to the connection of the control elements to a cold water supply, it will be understood that if the local temperature in the bath is to be raised, a gaseous heating medium may be supplied to the control elements.

In FIGURE 1, at 50 and 51, are respectively indicated thermal devices for obtaining the required temperature gradient in the bath and the corresponding temperature in the headspace over the bath.

We claim:

1. An apparatus for the manufacture of flat glass comprising, in combination, a tank structure containing a molten metal bath, means for delivering the glass to the bath and developing on the surface thereof a glass ribbon of definite width, means for advancing the glass ribbon along the bath and cooling it sufficiently to allow the ribbon to be taken without damage from the bath by mechanical conveying means, the width of the glass ribbon being substantially less than the width of the surface of the molten metal bath, at least in localities where the ribbon is deformable, and means for counteracting any objectionable bodily edgewise movement of the glass ribbon in either direction in such localities as it is advanced along the bath surface so as to maintain the ribbon in a straight path of travel along the bath, said means comprising heat control elements arranged in the molten metal bath at or near the surface thereof and located in different localized regions along the bath, each of said heat control elements being elongated and extending lengthwise of the bath in a direction parallel to the intended path of travel of the glass ribbon and located in proximity to but out of contact with the confronting edge of the ribbon, said heat control elements being capable of setting up in the respective localized regions convection currents in the molten metal bath which cause a transverse movement of the surface of the bath in contact with the under surface of the glass ribbon in a direction opposed to that of any objectionable bodily edgewise movement of said ribbon.

2. An apparatus according to claim 1, wherein there is a plurality of heat control elements arranged on each side of the glass ribbon, those on one side acting to create convection currents which cause a surface movement of the bath in one transverse direction, and those on the other side acting to create convection currents which cause a surface movement of the bath in an opposite transverse direction.

3. An apparatus for the manufacture of flat glass comprising, in combination, a tank structure containing a molten metal bath, means for delivering the glass to the bath and developing on the surface thereof a glass ribbon of definite width, means for advancing the glass ribbon along the bath and cooling it sufficiently to allow the ribbon to be taken without damage from the bath by mechanical conveying means, the width of the glass ribbon being substantially less than the width of the surface of the molten metal bath, at least in localities where the ribbon is deformable, and means for counteracting any objectionable bodily edgewise movement of the glass ribbon in either direction in such localities as it is advanced along the bath surface so as to maintain the ribbon in a straight path of travel along the bath, said means comprising a plurality of tubular control elements located in different localized regions along the bath, each of said tubular control elements consisting of arms freely passing through the respective side wall of the tank structure and an intermediate part connecting the arms, said intermediate connecting part being elongated and arranged in the molten metal bath at or near the surface thereof and extending lengthwise of the bath in a direction parallel to the intended path of travel of the glass ribbon, and said intermediate connecting part being located in proximity to but out of contact with the confronting edge of the glass ribbon, means for circulating a fluid medium through the tubular control elements for varying the local temperature of the molten metal bath in the regions contacted by the intermediate connecting part of the control elements and thus set up convection currents in said bath which cause a transverse movement of the surface of the bath in contact with the under surface of the glass ribbon in a direction opposed to that of any objectionable bodily edgewise movement of the ribbon, and means for axially adjusting the arms of the control elements to set the respective intermediate connecting parts at the desired distance from the confronting edge of the glass ribbon.

4. An apparatus according to claim 3, including a plurality of sealing means fixed to a side wall of the tank structure, through which sealing means the arms of the tubular control elements freely pass.

5. An apparatus according to claim 3, including vertically adjustable supports for the arms of the tubular control elements to locate the intermediate connecting parts thereof at different levels in the bath, the side wall of the tank structure having vertical elongated passages for the arms of the control elements to permit such vertical adjustment of said elements, and an impervious heat resisting flexible container mounted on each arm and near the tank structure above the respective passage and connected to the tank structure to form a gas seal about the arms against gas flow through the passage.

6. Apparatus according to claim 5, comprising gas seals about the arms of the control elements each seal being constituted by plates mounted on the tank structure to overlap the respective passage, each plate comprising a socket offset to the plate through which socket one of the arms pass, said socket having a diameter sufficiently greater than that of the arm to permit the arm to be adjusted vertically in the socket to vary the depth of immersion of the said intermediate part in the bath, and the flexible container mounted on the arm being secured on the respective socket to provide a gas seal over the permitted range of vertical adjustment for the arm.

7. Apparatus according to claim 6, wherein the arms are cross braced, and the vertically adjustable support for the arms comprises a stub on tank structure above the arms and in the mid-plan thereof, a slotted stem located on the stub and emanating from a bridge carrying two slotted depending plates disposable over the arms, means for clamping the stem to the stub and means for axially setting the arms with respect to the depending plates, whereby the vertical support may be adjusted in a vertical plane and vertically to prescribe the setting of the said intermediate part with respect to the bath surface.

8. Apparatus according to claim 3, wherein the outer ends of the arms are downwardly bent to constitute handles to facilitate axial displacement of the arms to determine the setting of the spaced relation of the intermediate part with respect to the adjacent edge of the ribbon of glass.

9. Apparatus according to claim 3, wherein the intermediate part of a control element includes a straight part comprised in an offset to the arms, so that in a horizontal position for the arms the straight part is at the level of the bath surface.

References Cited by the Examiner

UNITED STATES PATENTS

| 710,357 | 9/1902 | Heal | 65—95 |
| 1,564,240 | 12/1925 | Hitchcock | 65—182 X |
| 1,790,774 | 2/1931 | Spinasse | 65—91 |
| 2,975,224 | 3/1961 | Burch | 65—157 X |

FOREIGN PATENTS

| 567,339 | 11/1958 | Belgium. |
| 367,428 | 6/1939 | Italy. |

DONALL H. SYLVESTER, *Primary Examiner.*

ARTHUR P. KENT, WILLIAM B. KNIGHT,
*Examiners.*